United States Patent [19]

Hickman

[11] Patent Number: 4,810,544

[45] Date of Patent: Mar. 7, 1989

[54] PRINTING MEDIA SLEEVE

[75] Inventor: Mark S. Hickman, Escondido, Calif.

[73] Assignee: Hewlett-Packard Company, Palo Alto, Calif.

[21] Appl. No.: 131,955

[22] Filed: Dec. 11, 1987

[51] Int. Cl.[4] .......................... B32B 7/06; B32B 7/12

[52] U.S. Cl. ...................................... 428/40; 428/124; 428/137; 428/194; 428/202; 428/203; 40/661

[58] Field of Search .................. 428/13, 40, 124, 194, 428/203, 137, 202; 283/109; 40/10 D, 661, 155

[56] References Cited

U.S. PATENT DOCUMENTS 3,670,434 6/1972 Shibata et al. .................... 428/13 X 4,645,241 2/1987 Sfikas ................................ 283/109

*Primary Examiner*—Alexander S. Thomas

*Attorney, Agent, or Firm*—Eugene H. Valet

[57] ABSTRACT

A transparent sleeve for protecting printed media is disclosed. A sheet of transparent material with a single fold dividing said sheet into two halves has a strip of double adhesive-sided tape running the length of an edge of said sheet substantially parallel to said fold. When folded, said single sheet forms a sleeve for protecting printed media.

7 Claims, 1 Drawing Sheet

PRINTING MEDIA SLEEVE

BACKGROUND OF THE INVENTION

1. Field of the Invention

The present invention relates generally to the protection of printing media and the like. More particularly, the present invention relates to transparent, printed-sheet protection sleeves.

2. Description of the Related Art

An example of a prior art typical, transparent, printed-sheet protection sleeve is shown in FIG. 1. Such protectors are generally made of some type of acetate or Mylar film (Mylar is a registered trademark of E.I. duPont de Nemours & Co.).

The protector 11 is generally a single sheet 13 having parallel folds 15, 17.

One fold 17 is near an edge 19 of the sheet 13. Thus, that fold 17 forms a minor, or "sealing," flap 21.

The other fold 15 is positioned to form a major flap 29 so that when the sheet 13 is folded, as depicted by arrow 27, another edge 23 of the sheet 13 substantially meets the edge fold 17, as depicted by broken lines 25. When so folded minor flap 21 can be folded over major flap 29, as indicated by arrow 32 to form the sheet 13 into a sleeve. Printed media can thus be protected from environmental or handling damage.

Aligned holes, 30, 31 are generally provided to allow the user to store used protectors 11 in loose-leaf notebooks.

Alternatively to fold-sealing, permanent sealing such as by heat staking or ultrasonic welding is used. This sealing method may not be used with diacetate, however, due to inherent properties of the material. Moreover, such sealing does not allow alternate sealing and unsealing of a given sleeve.

Several weaknesses exist in such prior art embodiments. These types of protectors are often manufactured of diacetate. Diacetate is particularly brittle and, therefore, easy to tear. As a result, there is a tendency to develop cracks, particularly in the folds and around the holes, thus shortening the effective life expectancy of the protector.

Diacetate also has an affinity to absorb moisture from the environment. One result is that the sealing flap tends to curl and catch, causing handling and storage problems. Additionally, this causes the sleeves to become unaesthetic, and in extreme cases the sealing flap ceases to function as a useful seal.

Aesthetics can be particularly important if the sleeve is to be used to hold projection transparency media.

Other examples include sleeves and envelopes manufactured from clear plastic. These types are typically however, more expensive. Also, they are not as clear as sleeves made of diacetate, which, again, is of particular importance when used for projection media.

Hence, there is a need for improved printed media sleeves.

SUMMARY OF THE INVENTION

It is an advantage of the present invention that it eliminates the need for a secondary edge fold and, hence, the inherent functional and asethetic problems associated therewith.

It is another advantage of the present invention that it provides a device to hold the print media in place without punching any holes in the media itself.

It is a further advantage of the present invention that it provides the same ease of insertion of printed media as any open folder.

It is yet an additional advantage of the present invention that it provides a stronger set of loose-leaf binder holes.

In its basic aspects, the present invention comprises a sleeve device for protecting printed media, comprising a single sheet of transparent material having at least one fold dividing said sheet approximately into two halves; sticking means, near at least one edge of said sheet distal from said fold, for holding said halves together, such that when folded said single sheet forms a sleeve for protecting said printed media.

Other objects, features and advantages of the present invention will become apparent upon consideration of the following detailed description and the accompanying drawings, in which like reference designations represent like features throughout the figures.

The drawings referred to in this description should be understood as not being drawn to scale except if specifically noted.

DETAILED DESCRIPTION OF THE INVENTION

Reference is made now in detail to a specific embodiment of the present invention, which illustrates the best mode presently contemplated by the inventor(s) for practicing the invention. Alternative embodiments and features are also briefly described as applicable.

Figure 1:
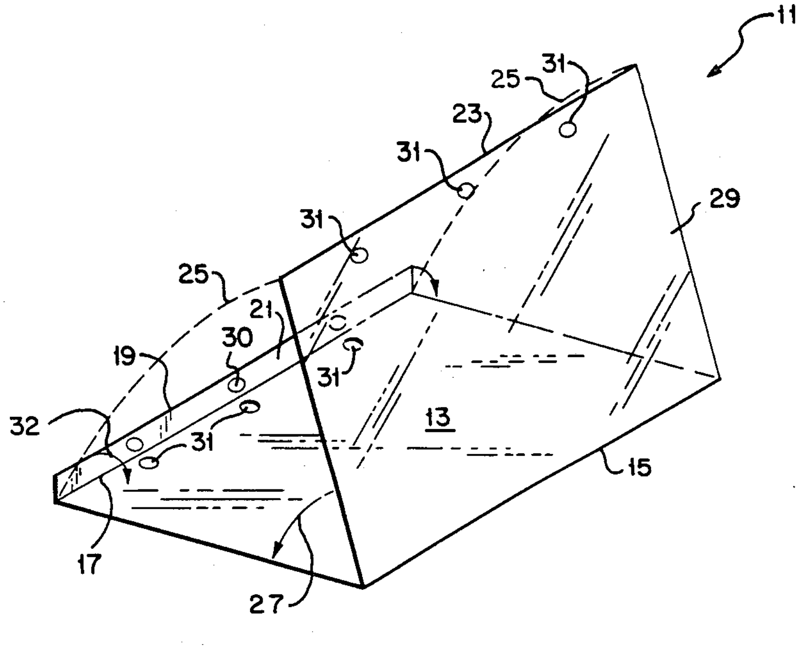
FIG 1 (PRIOR ART)
FIG. 1 is a perspective drawing of an exemplary transparent, printed-sheet protection sleeve as is known in the prior art.
Figure 2:
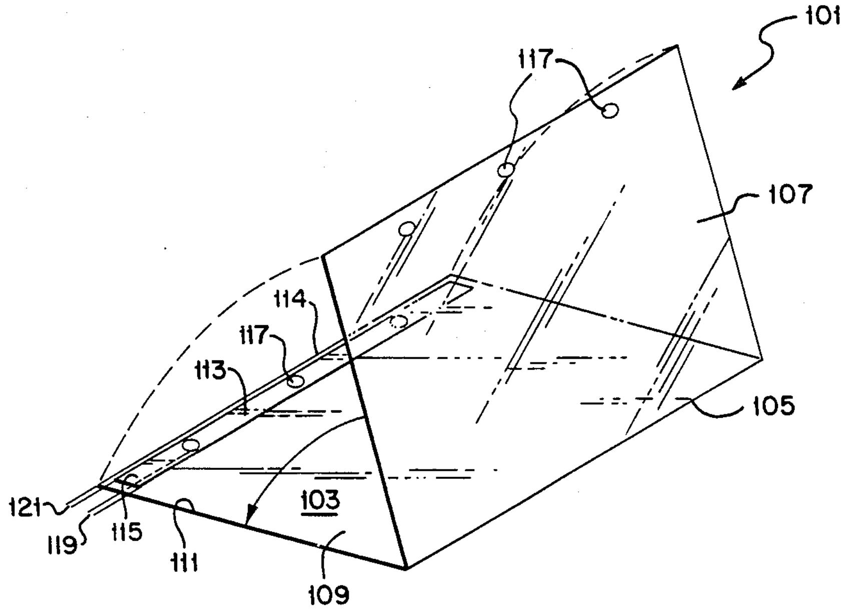
FIG. 2 is a perspective drawing of the present invention.

Referring to FIG. 2, a preferred embodiment of sleeve 101 is shown. In the preferred embodiment, the sleeve 101 is a sheet 103 of transparent, diacetate.

A single fold 105 divides the sheet 103 into two approximately equal halves, referred to for convenience of description as top sheet 107 and bottom sheet 109. No limitation is intended by these designations.

Located on top surface 11 and near an edge 114 of bottom sheet 109, there is a tape strip 113. In the preferred embodiment, it is an opaque, half-inch wide, double stick tape with differential release coefficients. A substantially permanent adhesive on the side adjoining top surface 111 of bottom sheet 109 provides a substantially fixed positioning of the tape strip 113. Tape strip 113 has a releasable sticky side 115.

Additionally, binder holes 117 in bottom sheet 109 may be put through the tape strip 113, with tape strength thus providing reinforcement of said holes 117.

A low tack, reusable adhesive is used on the side 115 of the tape which will releasably adhere to top sheet 107 as it is brought into contact with the tape strip 113.

In an alternative embodiment, the tape strip 113 can be made wide enough to extend inwardly from the holes 117 a sufficient distance 119 to provide the user with a tacky strip region along the inner length of the strip 113 which can be used to hold a printed media sheet fixedly between the top sheet 107 and the bottom sheet 109 of the sleeve 101.

Additionally, in order to prevent unwanted sticking to the tape strip 113, the strip can be indented a distance 121 from the edge 114 of the bottom sheet 109.

Alternatively, said tape strip 113 could be moved to other areas on surface 111.

Furthermore, said invention could be practiced using separate, rather than folded, transparent sheets.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. An improved, reusable, transparent sleeve for protecting printed media, having a single sheet of transparent material with a single fold dividing said sheet into two halves, said improvement comprising:

a strip of double-sided adhesive tape running the length of an edge of said sheet substantially parallel to said fold, releasably holding said halves together, such that when folded said single sheet forms a sleeve, open along at least one edge, for protecting printed media.

2. The device as set forth in claim 1, wherein said strip is indented from said one edge.

3. The device as set forth in claim 1, wherein said tape has a substantially permanent adhesive on a face which contacts said sheet along said edge and a low tack adhesive on an opposite face, whereby said low tack face can be used repeatedly to releasably hold a corresponding region parallel to the opposing edge of said sheet.

4. The device as set forth in claim 3, wherein said strip has a width sufficient to also hold an edge of said printing media.

5. The sleeve as set forth in claim 4, wherein said tape strip further comprises:

said tape strip being located congruently with binder holes through said sleeve such that said tape strip surrounds and reinforces said holes.

6. A sleeve device for protecting printing media, comprising:

a single sheet of transparent material having at least one fold dividing said sheet approximately into two halves;

a strip of double-sided sticking means, near at least one edge of said sheet which is distal from said fold, for holding said halves together, such that when folded said single sheet forms a sleeve for protecting said printing media, said strip running substantially parallel to said fold along said one edge of said sheet, wherein said strip is indented from said one edge and wherein said tape has a substantially permanent adhesive on a face which contacts said sheet along said edge and a low tack adhesive on an opposite face, whereby said low tack face can be used repeatedly to releasably hold a corresponding region parallel to the opposing edge of said sheet.

7. The device as set forth in claim 6, wherein said strip has a width sufficient to also hold an edge of said printing media.

* * * * *